April 21, 1931.        J. M. BOYKOW        1,801,947
APPARATUS FOR THE DIAGONAL CONTROL OF MOVING
OBJECTS PARTICULARLY AEROPLANES
Filed Feb. 15, 1930
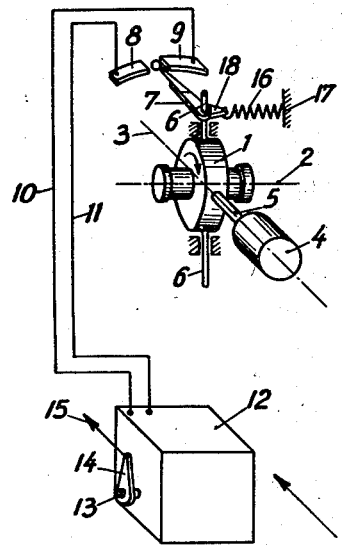
Inventor
Johann Maria Boykow
by Lyma & Kehlenbeck
Attorneys.

Patented Apr. 21, 1931

1,801,947

UNITED STATES PATENT OFFICE

JOHANN MARIA BOYKOW, OF BERLIN-LICHTERFELDE, GERMANY, ASSIGNOR TO MESSGERÄTE BOYKOW, G. M. B. H., OF BERLIN-LICHTERFELDE-WEST, GERMANY, A CORPORATION

APPARATUS FOR THE DIAGONAL CONTROL OF MOVING OBJECTS, PARTICULARLY AEROPLANES

Application filed February 15, 1930, Serial No. 428,848, and in Germany February 22, 1929.

The object of this invention is to provide a device for the damped diagonal control, i. e. damped stabilizing with respect to their longitudinal axis of moving objects, in particular aeroplanes. The device serves the purpose of preventing the lateral inclination of an aeroplane during straight line flight, and of giving the necessary inclination during curved flight. The device according to the invention is characterized by a gyroscope which rotates about a horizontal axis, parallel to the transverse axis of the moving object, the aeroplane, and which has a precession axis vertical to the said transverse axis, the said gyroscope, under the influence of a moment of force, for instance a spring engaging with the arm of a lever, tending to maintain its zero position, and the casing of the gyroscope being connected with a mass mounted eccentrically corresponding to the inclination or lateral accelerations. The gyroscope has, therefore, a centre of gravity which is eccentric with respect to its vertical precession axis, and may be regarded as a horizontal pendulum.

The use of gyroscopes for the stabilizing of aeroplanes is in itself known.

A gyroscope arranged in the said manner carries according to the invention a contact arm, co-acting with fixed contacts, and controls the lateral balancing rudder, the so-called ailerons, of the moving object, the aeroplane. The control is effected by means of a servomotor, which may be switched in or out by the contact device.

The drawing shows diagrammatically a device according to the invention. In what follows, it will be described as a device for the diagonal control of an aeroplane.

The gyroscope rotates in its casing 1 about its axis 2, the said axis being parallel to the transverse axis of the aeroplane. A mass 4 on a supporting arm 5 is mounted on the casing in the longitudinal axis of the aeroplane and eccentrically to the centre of gravity of the gyroscope. The precession axis 6 of the gyroscope is vertical. On the said precession axis is mounted a contact arm 7 co-acting with fixed contacts 8 and 9. Leads 10 and 11 are connected with a reversing gear in a housing 12, containing a continuously-running servo-motor which may be connected through the reversing gear with a spindle 13 in one or the other direction of rotation. An arm 14 is mounted on the spindle 13, and a rod 15 connects the said arm to the gear of the ailerons. A spring 16 is fixed by one end at 17, and engages with its other end an arm 18 of a lever secured to the precession axis of the gyroscope.

The device described functions in the following manner:

Assuming that the aeroplane has a small lateral angle of inclination, which shall be denoted by $a$, the mass 4 will then exert on the gyroscope a turning moment $$P_1 = m \cdot a \cdot g \cdot \sin a.$$

where $m$ is the mass, $a$ the arm of the lever of the mass with respect to the precession axis 6 and $g$ the acceleration due to gravity. This turning moment causes the contact arm 7 to turn, whereby the ailerons are also caused to turn in the sense that the angle $a$ is made smaller. The lateral inclination then changes with an angular velocity of $$\frac{da}{dt}$$

and the turning moment of the precession of the gyroscope is equal to $$P_2 = J \cdot \frac{da}{dt}$$

It results from these two equations that the angular velocity $$\frac{da}{dt}$$

can only increase until the turning moment $P_2$ of the precession is equal to the turning moment $P_1$ of the mass. At that instant, the angular velocity $$\frac{da}{dt} \sim \sin a$$

This relationship implies that the angular velocity $$\frac{da}{dt}$$

decreases as the angle $a$ decreases, i. e. the return of the aeroplane into the position of lateral balance is damped. This damping is essential for practical stabilizing, for otherwise the aeroplane would oscillate about the equilibrium position.

The device functions suitably for all disturbances of lateral equilibrium, the spring 16 acting as a return guide and assisting the damping.

That the above considerations also apply to curved flight follows from the fact that in the curve the equilibrium position itself is inclined, corresponding with the resultant of the acceleration due to gravity and that due to the centrifugal force.

What I claim is:

1. A device for the damped diagonal control of moving objects comprising a gyroscope rotating about an horizontal axis parallel to the transverse axis of said moving object and having a precession axis perpendicular to this transverse axis and to the direction of movement, the said gyroscope having its centre of gravity lying outside the precession axis and controlling the ailerons by turning about the precession axis.

2. A device for the damped diagonal control of moving objects comprising a gyroscope rotating about an horizontal axis parallel to the transverse axis of said moving object and having a precession axis perpendicular to this transverse axis and to the direction of movement, a turning moment tending to maintain the gyroscope in its zero position being imparted to the gyroscope, the gyroscope having its centre of gravity lying outside the precession axis and controlling the ailerons by turning about the precession axis.

3. A device for the damped diagonal control of moving objects comprising a gyroscope rotating about an horizontal axis parallel to the transverse axis of said moving object and having a precession axis perpendicular to this transverse axis and to the direction of movement, a turning moment tending to maintain the gyroscope in its zero position being imparted to the gyroscope by means of a spring, the gyroscope having its centre of gravity lying outside the precession axis and controlling the ailerons by turning about the precession axis.

4. A device for the damped diagonal control of moving objects comprising a gyroscope rotating about an horizontal axis parallel to the transverse axis of said moving object and having a precession axis perpendicular to this transverse axis and to the direction of movement, a pendulous mass eccentric to the precession axis being connected to the gyroscope, the gyroscope controlling the ailerons by turning about the precession axis.

5. A device for the damped diagonal control of moving objects comprising a gyroscope rotating about an horizontal axis parallel to the transverse axis of said moving object and having a precession axis perpendicular to this transverse axis and to the direction of movement, the said gyroscope having its centre of gravity lying outside the precession axis and controlling the ailerons by turning about the precession axis, and by means of a contact device and a servo-motor controlled by this device.

In testimony whereof I affix my signature.

JOHANN MARIA BOYKOW.